United States Patent [19]

Homsy et al.

[11]  4,243,021
[45]  Jan. 6, 1981

[54] SOLAR HEAT CONVERSION PANEL AND METHOD OF ASSEMBLY

[75] Inventors: Charles A. Homsy; Paul T. Homsy, both of Houston, Tex.

[73] Assignee: Vitek, Inc., Houston, Tex.

[21] Appl. No.: 868,016

[22] Filed: Jan. 9, 1978

[51] Int. Cl.³ ................................................. F24J 3/02
[52] U.S. Cl. .................................... 126/449; 126/441; 126/450; 126/426
[58] Field of Search ............... 126/270, 271, 426, 449, 126/444, 446, 448, 450, 452, 901; 237/1 A; 264/56, 45.3, 49, DIG. 17

[56] References Cited

U.S. PATENT DOCUMENTS

| | | | |
|---|---|---|---|
| 3,102,532 | 9/1963 | Shoemaker | 126/901 |
| 3,992,725 | 11/1976 | Homsy | 264/56 |
| 4,018,211 | 4/1977 | Barr | 126/27 G |
| 4,036,209 | 7/1977 | Press | 126/426 |
| 4,119,083 | 10/1978 | Heyen et al. | 126/27 G |
| 4,129,117 | 12/1978 | Harvey | 126/271 |
| 4,129,120 | 12/1978 | Saunders | 126/271 |

Primary Examiner—Carroll B. Dority, Jr.
Assistant Examiner—Lee E. Barrett
Attorney, Agent, or Firm—Michael P. Breston

[57] ABSTRACT

The panel for converting solar energy to sensible heat of a working fluid comprises a thermally-insulated and impervious base member overlayed with and spaced from a solar-collecting member or collector. The collector is in turn overlayed with and spaced from a pair of mutually spaced impervious films which are essentially transparent to incident solar radiation and substantially opaque to radiation emitted by the collector. The solar-collecting member consists of a thermally-insulating porous matrix substance and of a second substance affixed thereto. The second substance is in divided and substantially discrete form. The second substance exhibits a high degree of absorptivity for solar radiation and low emissivity for long wave radiation. The working fluid to be heated is admitted to a chamber underneath the solar-collecting member. The working fluid has a pressure sufficient to cause it to percolate through the collector. The percolated fluid is collected between the collector and the first overlaying film.

The panel assembly is formed by connecting the solar panels in series and/or parallel arrays which carry the working fluid and allow it to absorb the desired quantity of heat.

21 Claims, 11 Drawing Figures

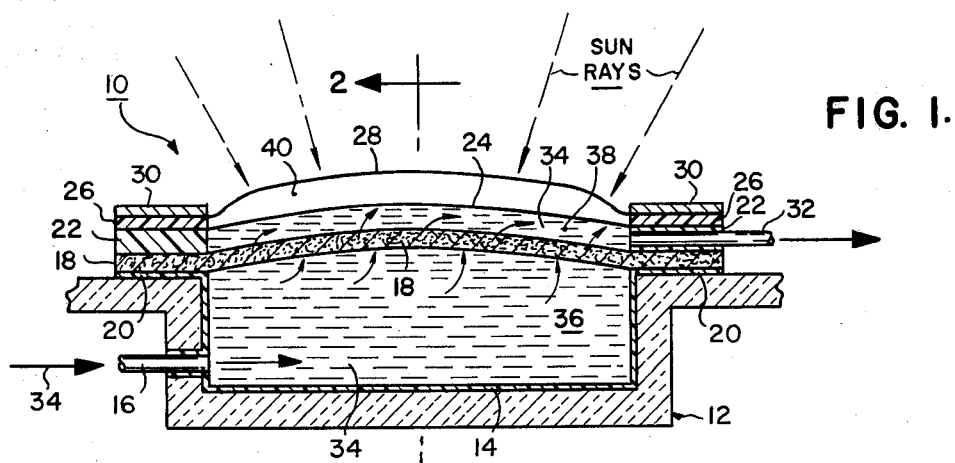
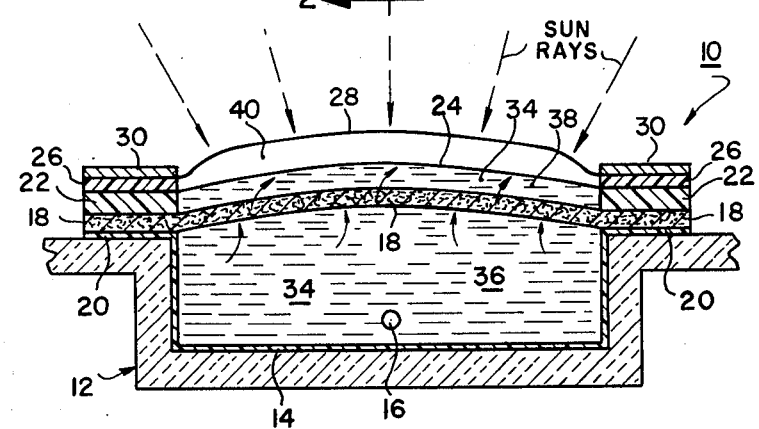
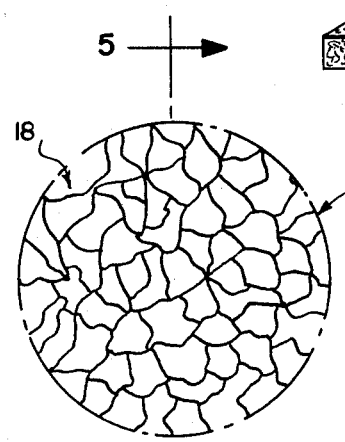
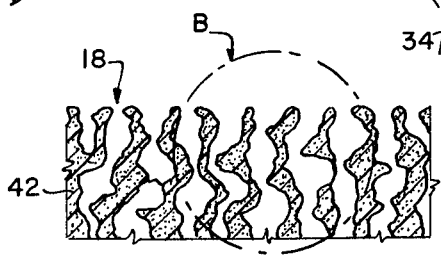
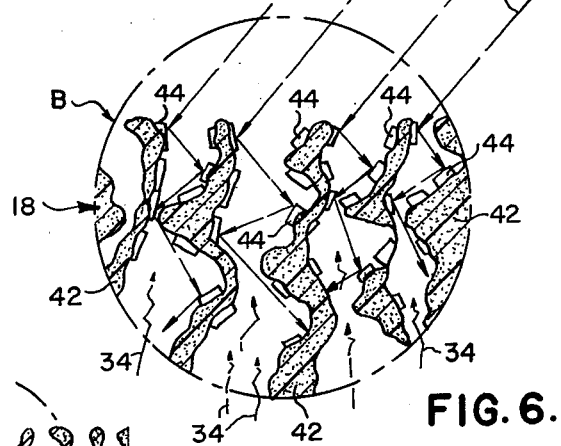
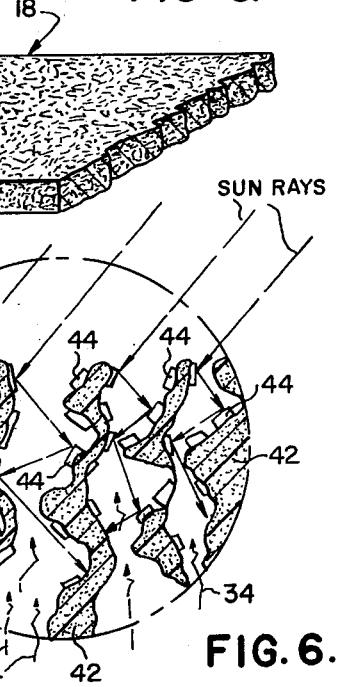

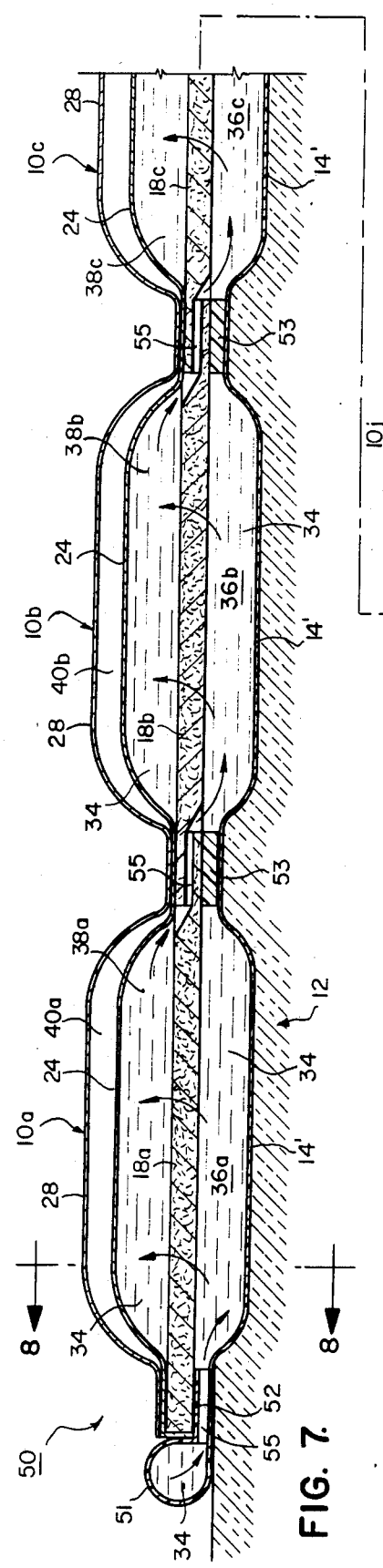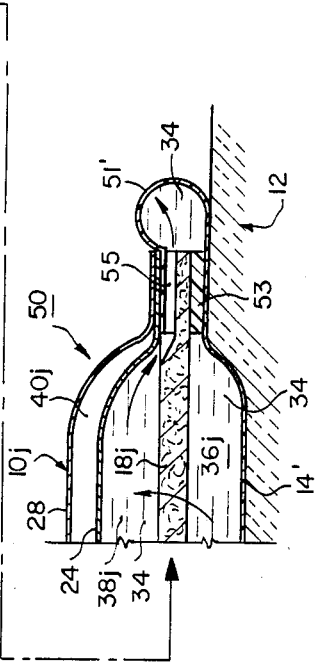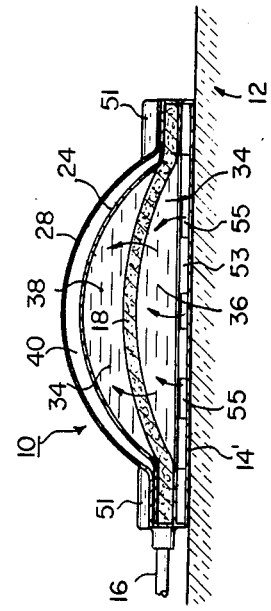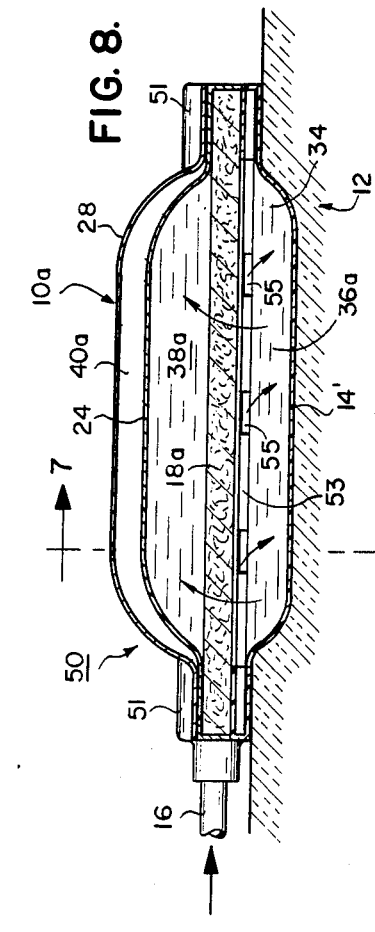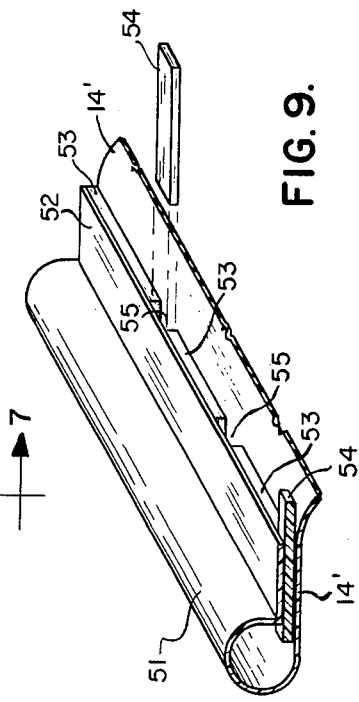
FIG. 7.
FIG. 8.
FIG. 9.
FIG. 10.

SOLAR HEAT CONVERSION PANEL AND METHOD OF ASSEMBLY

BACKGROUND OF THE INVENTION

Many designs of solar panels, particularly plate panels, have been proposed and built. Such collectors vary in their construction materials, working fluid coupling, and geometrical arrangements. A good description of known solar-energy panels can be found in the following references: Energy Primer Solar, Water Wind and Biofuels, published by Fricke-Parks-Press, Inc. 1974, PP. 6-9; Solar Energy Thermal Properties published by John Wiley & Sons, Inc., 1974, PP. 162-168; and U.S. Pat. Nos. 3,102,532, 3,902,474, 3,923,038, 3,908,631 and 3,254,643. In known collectors, the solar radiation absorbing member is typically a metal sheet (usually aluminum or copper painted black) which is heated by impinging solar radiation, and this heat is conducted by the working fluid (usually water) which contacts the metal or flows through passages in the metal. The water being heated is then pumped to a heat exchanger wherein house water or air is to be warmed. However, the known designs of such collectors exhibit numerous known disadvantages, chief among which are the following:

1. absorption of incident solar radiation occurs on a relatively smooth surface whereat reflection losses can be significant;
2. thermal energy generated in metallic surfaces pass by conduction to the periphery of the collector's structure and therefore there is a need for substantial insulation of the collector to minimize conductive heat losses to its surroundings;
3. relatively poor conduction of heat from the metal to the working fluid in the metal's passages;
4. corrosion and general deterioration of the collector's construction materials frequently takes place; and
5. fabrication costs are substantial, especially since most known solar collectors are expensive to mass produce.

SUMMARY OF THE INVENTION

The present invention relates to an improved solar heat conversion panel and to an assembly consisting of several such panels suitably interconnected. The assembly is relatively efficient, durable, light weight, and lends itself to mass production by relatively unskilled labor. The structure is easily adaptable for domestic uses and can be readily installed by home owners.

In a simplified embodiment, the solar panel comprises a thermally-insulated base member overlayed with and spaced from a solar-collecting member or collector. The collector is in turn overlayed by and spaced from a first impervious film which is essentially transparent to incident solar radiation and substantially opaque to long-wave radiation. A second overlaying impervious film is spaced from the first film and is also essentially transparent to incident solar radiation and substantially opaque to long-wave radiation. Each panel has a fluid inlet and a fluid outlet. The working fluid passes into a reservoir chamber formed between the base member and the collector. From this chamber, the working fluid percolates through the collecting and collects into a collector chamber formed between the collector and the first overlaying film.

In the preferred embodiment, the solar-collecting member is a thin sheet material consisting of a thermally-insulating porous matrix substance and of a second substance affixed to such matrix in divided and substantially discrete form. This second substance exhibits a high degree of adsorptivity for solar radiation and low emissivity for long-wave radiation. The matrix substance is made of a polymeric material selected from the group consisting of polyethenes, polyesters, polyamides, polycarbonates, polysulfones, or silicone polymers. A specific matrix polymer is selected for resistance to degradation by solar radiation. The second substance consists of a carbonaceous material. On the other hand, a ceramic or metal material exhibiting a selective absorptivity surface could also be employed. A low-thermal conductivity fluid fills the space between the first and second films overlaying the collector. The films are selected from polymers that are essentially transparent to incident solar radiation and substantially opaque to long-wave radiation.

The novel solar-collecting panels and assemblies thereof offer certain desirable advantages over known solar collectors. The primary advantages are:

1. the working fluid is heated by direct and intimate contact with the substance within the solar collecting member which converts radiation to sensible heat;
2. heat losses to the surroundings by conduction are minimized because the thermal conductivity of the porous matrix substance of the solar-collecting member is selected to be low, and because the porosity of the matrix causes a reduced area for heat transfer. For these reasons the porous matrix is thermally insulating and sensible heat developed in the radiation-absorbing substance is minimally diverted to the surroundings through the mass of supporting matrix. The collected energy is preferentially and rapidly transferred to the working fluid under the greatest possible equilibrium temperature gradient.
3. surface and bulk macroporosity of the solar-collecting member act to entrap incident radiation because of multiple adsorption opportunities afforded a given ray of radiation. Moreover, hemispherical radiation (skylight) is more efficiently captured, since small angles of incident causing reflection are less likely because of the macroporosity of the surface of the solar-collecting material;
4. the bulk porosity of the solar-collecting member requires the working fluid to follow a tortuous flow path. Local heat transfer coefficients depend on local Reynold's numbers. Increasing the tortuosity of the fluid flow path at constant mass flow rate, increases the local Reynold's number, thereby improving the local heat transfer coefficient over that which is possible with fluid flow at the same working fluid mass rate through the tubing of a conventional flat-plate, solar-collector panel.
5. The improved solar-conversion panels of the invention can be used to form compact and lightweight structural assemblies which are flexible and impact resistant. The flexibility of such structures is a most important advantage thereof allowing easy accommodation to various support contours on which the assemblies are mounted. The flexibility of individual panels allows them to assume a convex profile with respect to incident solar radiation, thereby improving the solar collecting efficiency thereof.

BRIEF DESCRIPTION OF THE DRAWINGS

FIG. 1 is a sectional view of a simplified embodiment of the solar-collecting panel of the invention;

FIG. 2 is a sectional view taken on line 2—2 on FIG. 1;

FIG. 3 is a perspective partial view of the solar-collecting member of the invention;

FIG. 4 is an enlarged view of a portion of the surface structure of the collector shown in FIG. 3;

FIG. 5 is a sectional view along line 5—5 on FIG. 4;

FIG. 6 is an enlarged view of a portion of the member shown in FIG. 5;

FIG. 7 is a sectional view of a structural assembly composed of several solar-collecting panels;

FIG. 8 is a sectional view along line 8—8 on FIG. 7;

FIG. 9 is a perspective view illustrating a preferred method of fabricating the assembly of FIG. 7;

FIG. 10 is a sectional view of a variation of the solar-collecting panel shown in FIG. 8.

DESCRIPTION OF PREFERRED EMBODIMENTS

Figure 11:
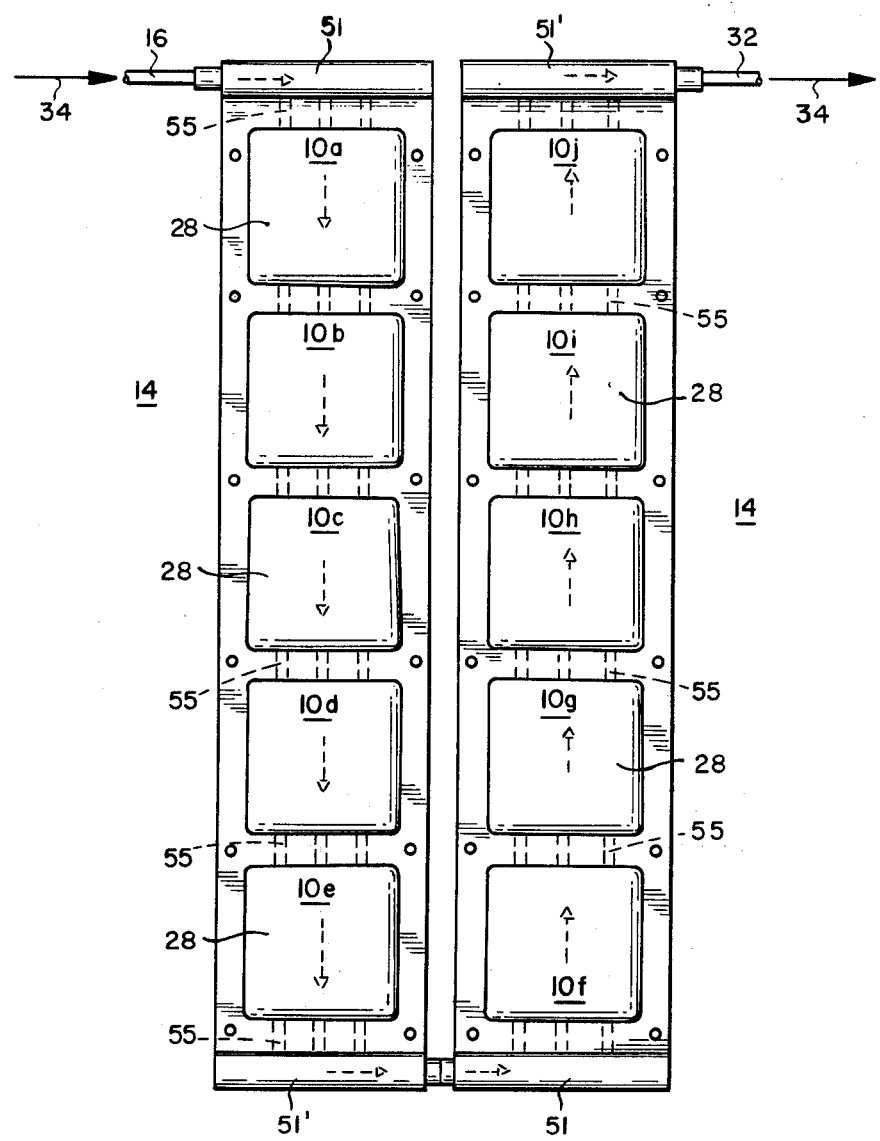
FIG. 11 is a top view of the assembly shown in FIG. 7.

Throughout the drawings the same reference characters will be used to designate the same or similar parts to facilitate the understanding thereof. A simplified embodiment of the solar-conversion panel 10 of the present invention includes a base member 12 consisting of an externally, thermally-insulated acrylic polymer flanged box 14 having a fluid inlet port 16. A sheet of the solar-collecting member 18 (herein sometimes referred to as the "collector"), overlays the annular flange 20 of box 14. A polyurethane polymer peripheral spacer 22 lies between the collector 18 and a first overlying film 24 of Teflon FEP polymer. An acrylic polymer, peripheral spacer 26 lies between the first film and a second overlying film 28 of similar material. A thicker acrylic peripheral frame 30 is on top of the second film and exerts pressure through external clamps not shown. Elements 14, 18, 20, 22, 26 can be secured to each other by any other suitable means.

An outlet port 32 is provided through the peripheral gasket 22. A working liquid 34, typically water, enters a reservoir chamber 36 formed within box 14. The water pressure within reservoir 36 is preferably such as to (1) cause the top surface of the panel 10 to assume a slightly convex shape, and (2) to cause the liquid 34 to percolate through the solar-collecting member 18. The collector member 18 also assumes a convex shape as shown in FIGS. 1, 2. The percolated liquid is collected in a collector chamber 38 formed between the member 18 and the first film 24. A pressure drop between 10 to 100 in. $H_2O$ across member 18 was found adequate.

The collected liquid in chamber 38 exits through the outlet port 32. The collector member 18 is heated by incident solar radiation and the percolating liquid absorbs such heat. Films 24 and 28 are transparent to incident solar radiation and are opaque to long-wave radiation. An air layer 40 is formed between the two Teflon FEP films 24, 28 to reduce conductive heat losses therethrough.

The preferred solar-collecting member 18 is made of a felt-like composite material having 80% by volume open porosity. The average pore size is approximately 200 microns. This composite material has a matrix substance 42 of polytetrafluoroethylene (PTFE) polymer on which are bonded short carbon fibers 44 in a substantially discrete array. The volume ratio of PTFE to carbon fiber is 1:1. Such a material is commercially available from Vitek, Inc., Houston, Texas and is sold under the trademark PROPLAST.

Analogous composite materials can be made exhibiting different porosity levels and different ratios of the carbon fiber and PTFE ingredients. It has been found that materials so prepared preferably exhibit a volume ratio of carbon to PTFE between 2:1 and 1:10. As the volume ratio of carbon fiber to PTFE is increased, a discrete array of the individual carbon fibers on the surface of the PTFE becomes less probable. If the volume ratio of carbon fiber to PTFE is reduced, the effectiveness of the material for solar radiation entrapment is impaired.

It has been found that the porosity is preferred between 50% void volume and 90% void volume with a mean pore diameter between 100 micra and 800 micra. An overly high porosity is detrimental to the physical strength of the material, while an overly low porosity is detrimental to the water passage through the collector 18. The preferred porosity will optimally balance such effects.

The matrix substance 42 is made of a polymeric material selected from the group consisting of polyethenes, polyesters, polyamides, polycarbonates, polysulfones, or silicone polymers. For example, the PTFE ingredient can be substituted by other suitable polymers such as polyaramide, polyethylene terepthalate, and copolymers of tetrafluoroethylene and hexafluoropropylene. Any fabricable polymer exhibiting low thermal conductivity and good stability to incident radiation may be used. In addition, the carbon fiber ingredient can be replaced by particulate carbon or by various fibers or particles of zirconia, alumina, silicon carbide, stainless steel, copper or aluminum. Of particular interest is the use of metallic wire which can be coated with a variety of wave-length selective coatings that maximize the ratio of absorbed radiant energy to re-radiated energy. Suitable such coatings can be found in AIChE symposium Series No. 164, Vol. 73 PP. 186-203 (1976).

Test data show an efficiency of solar energy captured by the solar panel 10 of this invention to be remarkably high. Such performance derives from the capability of the collector member 18 to collect not only a very high percentage of directly impinging solar radiation, but also a high percentage of skylight which reaches collector 18 from the full hemisphere of the sky.

The solar panel 10 is very importantly characterized by its amenability to relatively inexpensive mass-production techniques through the use of plastic fabrication technology.

A structural assembly 50 consisting of a plurality of individual solar-collecting panels 10a–10j is illusrated in FIGS. 7-11. In the construction of assembly 50, use is being made of the melt-fusing capability of the various elements. For that purpose, each panel 10 can consist of a polymeric insulating support 12, made, for example, from polyurethane, or polyethylene closed pore foams, or from a bubble pack of polyethylene. Support 12 can be fused directly to a base member 14' which can be made of any plastic material which can withstand environmental conditions. In one embodiment, a Teflon FEP sheet was employed for the base member 14'.

In panel 10a, base member 14' was to form an inlet manifold 51 having an outer lip 52. A plurality of fusion spacers 53 made of Teflon FEP polymer are laterally spaced apart under lip 52 (FIG. 9). In between the fusion spacers 53 are positioned longitudinal non-fusion strips 54 made from Teflon TFE.

The solar-collecting member 18 is positioned over lip 52 and the two films 24, 28 are laid over the solar collector 18 in a manner previously described in connection with the simplified embodiment shown in FIG. 1. The base member 14' and the several elements lying thereabove are fused to each other by a conventional melt sealing process using heat and pressure. The base member 14' becomes bonded to the fusion spacers 53 (FIG. 9) but not to the teflon strips 54 which are pulled out after the fusion process to form water-carrying channels 55 between the spacers 53 is completed. The other edge of panel 10a is constructed in a similar manner except that the water channels 55 are formed between the overlying edges of the adjacent solar-collecting members 18a and 18b of the adjacent pair of solar panels 10a, 10b, respectively. Suitable fusion spacers 53 can be interposed whenever a chamber is to be formed between a pair of overlying members, as will be apparent to those skilled in the art.

As illustrated in FIG. 7, the initially-heated water collected within chamber 38a will flow out from the first panel 10a into the next panel 10b through channels 55. The warm water will flow into reservoir chamber 36b from which it will percolate through the solar-collecting member 18b into the collector chamber 38b, and in so doing the water will be additionally heated by the solar heat collected within the collector 18b.

Panel 10e is provided with an exit manifold 51' which is coupled to the inlet manifold 51 of panel 10f (FIG. 11). The last solar-collecting panel 10j will produce hot water within its collector chamber 38j thereof which will exit through channels 55 into exit manifold 51' for supplying hot water to a heat utilization device, not shown. It will be apparent that as many panels can be connected in series or parallel as needed to fill the needs of a particular utilization device.

What is claimed is:

1. A solar energy collector panel having a fluid inlet port and a fluid outlet port, comprising:
    a porous body consisting of a thermally-insulating porous matrix material having a unitary mass enclosing surface and bulk macropores, the walls of said macropores defining tortuous fluid passageways in said body, and distinct elements discretely disposed on said walls of said macropores throughout said matrix material, said elements having a high degree of absorptivity for solar radiation and low emissivity for long-wave radiation;
    a first overlaying flexible member essentially transparent to incident solar radiation and substantially opaque to radiation emitted by said porous body, said first member and said porous body forming a collection chamber therebetween;
    a second flexible member overlaying said first member and spaced therefrom, said second member being essentially transparent to incident solar radiation and substantially opaque to radiation emitted by said porous body;
    a low-thermal conductivity fluid filling the space between said first and second members;
    means admitting a working fluid to be heated under said porous body through said inlet port, said working fluid being sufficiently pressurized to cause said working fluid to percolate through said passageways of said porous body into said collection chamber, thereby converting radiant energy to sensible heat in said working fluid; and
    said working fluid exiting from said collection chamber through said outlet port.

2. The panel of claim 1 wherein said pressurized working fluid causes the uppermost surface of said panel to assume a convex shape.

3. The panel of claim 1 wherein said first and second flexible members are films.

4. The panel of claim 1 wherein said matrix is a polymer.

5. The device of claim 1 wherein said material is a polymeric material.

6. The device according to claim 5 wherein said material is a member selected from the group consisting of: polyethene, polyester, polyamide, polycarbonate, polysulfone, or silicone alone or in combination.

7. A device according to claim 1 wherein said elements consist of a carbonaceous material.

8. The device according to claim 1 wherein said material is polytetrafluoroethylene and said substance is graphite fiber.

9. A device according to claim 5 wherein said material is polyethylene terepthalate and said substance is graphite fiber.

10. A device according to claim 5 wherein said material is polytetrafluorethylene and said elements consist of copper wire coated with nickel.

11. A device according to claim 8 wherein the volume ratio of the graphite fiber to polytetrafluoroethylene is in the range of 2:1 to 1:10 and said body having a void volume between 50% and 90%.

12. The device according to claim 8 wherein the volume ratio of graphite fiber to tetrafluoroethylene is 1:1 and said body having a void volume of 80%.

13. A method for converting incident radiant energy to sensible heat, comprising:
    positioning a body to intercept said incident radiant energy, said body consisting of a thermally-insulating porous matrix material having a unitary mass enclosing surface and bulk macropores, the walls of said macropores defining tortuous fluid passageways in said body, and distinct elements discretely being disposed on said walls of said macropores throughout said matrix material, said elements having a high-degree of absorptivity for solar radiation and low emissivity for long-wave radiation, and
    causing a working fluid to percolate through the passageways of said body, thereby converting said radiant energy to sensible heat in the working fluid.

14. In the method for converting incident radiant energy to sensible heat in accordance with claim 13, characterized in that said material is a polymeric material.

15. The method in accordance with claim 14 wherein said material is a member selected from the group consisting of: polyethene, polyester, polyamide, polycarbonate, polysulfone, or silicone alone or in combination.

16. The method in accordance with claim 13 wherein said elements consist of a carbonaceous material.

17. The method in accordance with claim 13 wherein said material is polytetrafluoroethylene and said substance is graphite fiber.

18. The method in accordance with claim 14 wherein said material is polyethylene terepthalate and said elements consist of graphite fibers.

19. The method in accordance with claim 14 wherein said material is polytetrafluorethylene and said elements consist of copper wire coated with nickel.

20. The method in accordance with claim 17 wherein the volume ratio of the graphite fiber to polytetrafluoroethylene is in the range of 2:1 to 1:10 and said body having a void volume between 50% and 90%.

21. The method in accordance with claim 17 wherein the volume ratio of graphite fiber to tetrafluoroethylene is 1:1 and said body having a void volume of 80%.

* * * * *